United States Patent
Stevens et al.

(10) Patent No.: US 9,478,982 B2
(45) Date of Patent: Oct. 25, 2016

(54) POWER SUPPLY SYSTEM AND METHOD

(71) Applicant: LINEAR TECHNOLOGY CORPORATION, Milpitas, CA (US)

(72) Inventors: Raymond Allen Stevens, Monument, CO (US); Matthew Joseph Maloney, Colorado Springs, CO (US); Kalin Valeriev Lazarov, Colorado Springs, CO (US); Edson Wayne Porter, Colorado Springs, CO (US)

(73) Assignee: Linear Technology Corporation, Milpitas, CA (US)

( * ) Notice: Subject to any disclaimer, the term of this patent is extended or adjusted under 35 U.S.C. 154(b) by 503 days.

(21) Appl. No.: 13/947,860

(22) Filed: Jul. 22, 2013

(65) Prior Publication Data

US 2015/0021987 A1   Jan. 22, 2015

(51) Int. Cl.
| | | |
|---|---|---|
| *H02J 1/10* | (2006.01) | |
| *H02J 3/38* | (2006.01) | |
| *H02J 7/34* | (2006.01) | |
| *H02J 1/00* | (2006.01) | |
| *G06F 1/26* | (2006.01) | |
| *G06F 1/32* | (2006.01) | |

(52) U.S. Cl.
CPC . *H02J 1/00* (2013.01); *G06F 1/26* (2013.01); *G06F 1/3209* (2013.01); *Y10T 307/305* (2015.04); *Y10T 307/707* (2015.04)

(58) Field of Classification Search
CPC ........ H02J 1/00; G06F 1/26; Y10T 307/305; Y10T 307/707
USPC ...................................... 307/18, 82
See application file for complete search history.

(56) References Cited

U.S. PATENT DOCUMENTS

| | | | |
|---|---|---|---|
| 7,000,124 B2 | 2/2006 | Chen et al. | |
| 7,000,125 B2 | 2/2006 | Chapuis et al. | |
| 7,337,342 B1 | 2/2008 | O'Brien | |
| 7,506,179 B2 | 3/2009 | Templeton | |
| 7,583,487 B2 | 9/2009 | Chapuis | |
| 7,685,320 B1* | 3/2010 | Wishneusky | G06F 1/26 323/222 |
| 8,239,597 B2 | 8/2012 | Wishneusky | |
| 2005/0289373 A1* | 12/2005 | Chapuis | G06F 1/26 713/300 |

\* cited by examiner

*Primary Examiner* — Carlos Amaya
(74) *Attorney, Agent, or Firm* — Han Santos Reich, PLLC (57) ABSTRACT

A power control system includes an event data bus configured to carry event information. Several power supply managers are coupled to the same event bus. Each power supply manager has one or more point of load (POL) regulators assigned to it. Each power supply manager communicates event information with other POL power supply managers over the event data bus.

17 Claims, 8 Drawing Sheets

POWER SUPPLY SYSTEM AND METHOD

TECHNICAL FIELD

This disclosure relates to power control systems, and more particularly, to methods and systems to control point of load regulators.

DESCRIPTION OF RELATED ART

In recent years there has been an effort to improve methods of and systems to provide power to various application specific circuits of an electronic system. Electronic systems, such as a semiconductor chips, frequently have different power supply requirements for each circuit or circuit block. Many such circuits require a relatively low voltage but at a high current with respect to other circuits within the system. As is known in the art, it is undesirable to route a low voltage at a high current over long distances throughout an electronic system. To accommodate the high current demand, the power wires are made wider, ultimately consuming substantial chip and system real estate. Further, the impedance of low voltage long wires consumes more power than short wires, leading to unnecessary power loss and an increase of system temperature. Still further, using a centralized power approach makes it difficult to provide the current/voltage to accommodate changes in the load.

To accommodate the foregoing problems, some power management systems have adopted various decentralized power architectures. For example, an intermediate bus voltage may be distributed throughout the electronic system, where individual point of load (POL) regulators are placed at the point of power consumption. POL regulators may be viewed as DC/DC converters that provide local power to their respective circuit. Thus, each POL regulator converts the bus voltage to the level that accommodates its circuit. Ideally, the POL regulator is physically close to its respective circuit that it is powering, thereby reducing any wiring power loss and temperature gain issues. Thus, the low voltage-high current lines are minimized in length. The intermediate bus voltage can be delivered to several POL regulators throughout the electronic system using low current lines that reduce power loss and chip real estate.

One drawback of traditional decentralized power supply systems is the lack of communication between different POL regulators. If one POL regulator fails, there typically was no way for the failure to be communicated to other similar POLs to prevent their failure.

Figure 1:
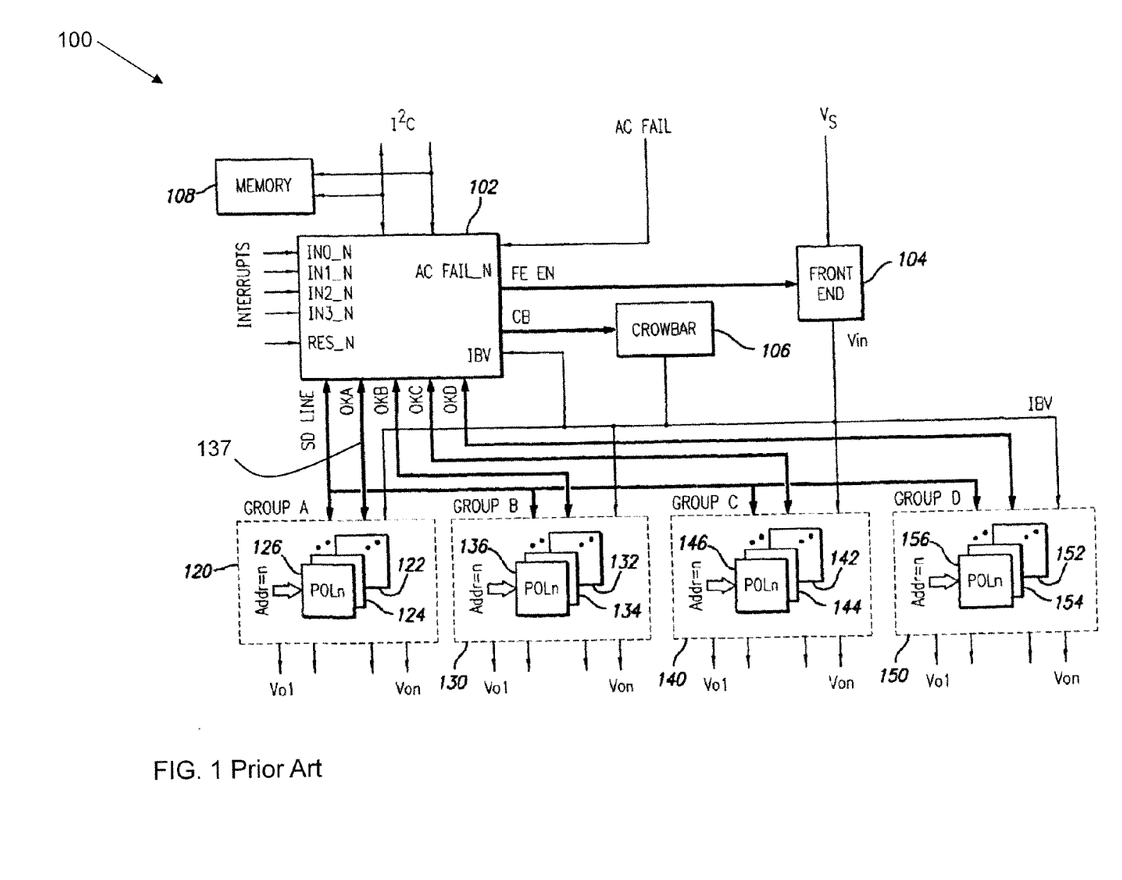
FIG. 1 illustrates a conventional distributed power supply management system.

FIG. 1 illustrates an exemplary power management system as described in U.S. Pat. No. 7,583,487 ("the '487 patent"), which attempts to resolve some of the foregoing problems. The system of FIG. 1 includes a bus controller 102 and a plurality of groups 120, 130, 140, and 150. Each of the groups includes several POL regulators (e.g., group A includes POLs 122, 124, and 126). Each group of POLs in FIG. 1 is coupled to its own OK wire (e.g., 137 for group A). Thus, for each additional group of POLs (e.g., 120) an additional communication wire is required between the master regulator 102 and the group. A separate communication channel between the master regulator and each group physically limits the number of groups that can be coupled to a master regulator—or at least complicates the system and wiring of the system. Further, the separate communication channels between the master regulator and each group typically requires that a POL be physically disconnected from one communication channel and reconnected to another in order to move the POL from one group to another.

Figure 2:
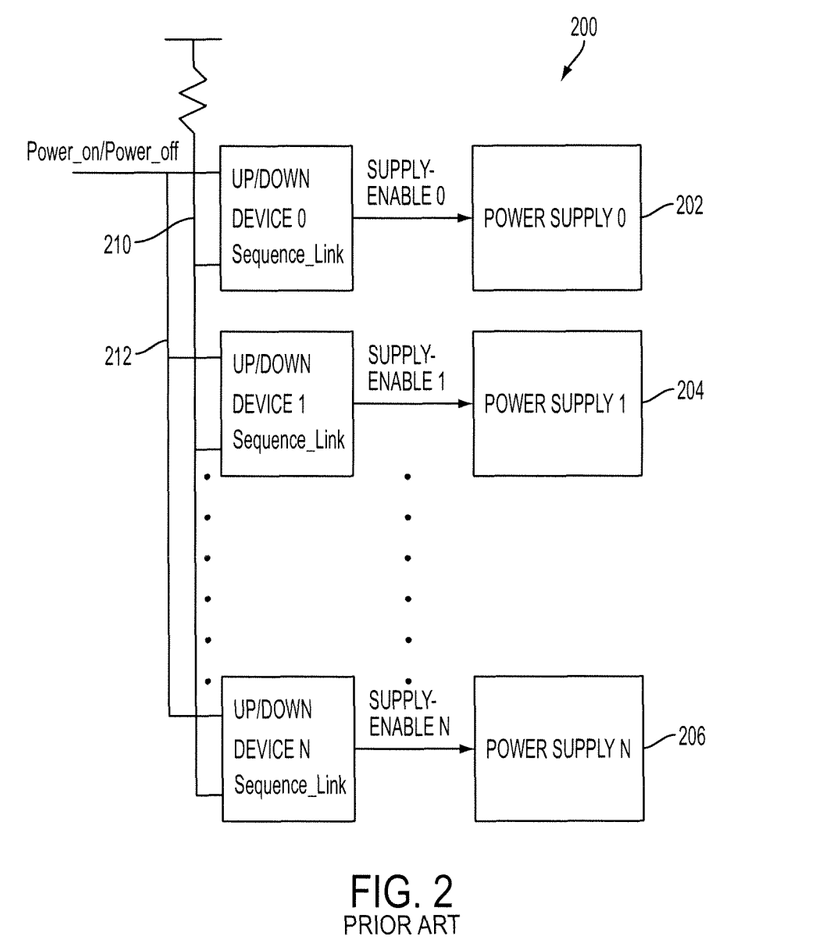
FIG. 2 illustrates another conventional distributed power supply management system.

FIG. 2 illustrates another exemplary power management system as described in U.S. Pat. No. 7,337,342 ("the '342 patent"). When a fault occurs in any one of the power supplies (POL) 202, 204, or 206, a master controller (not shown) is capable of turning all of the POL's OFF. In the '342 patent, the POLs 202, 204, and 206 form a single sequencing group that is coupled to a single Up/Down wire 212 and a single Sequence_Link wire 210. Additional POL sequence groups (not shown) require their own unique UP/Down and Sequence_Link wires. Thus, the '342 patent has similar limitations to expandability and POL group re-configurability as the '487 patent, because each additional POL sequence group would add an additional pair of wires.

Figure 3:
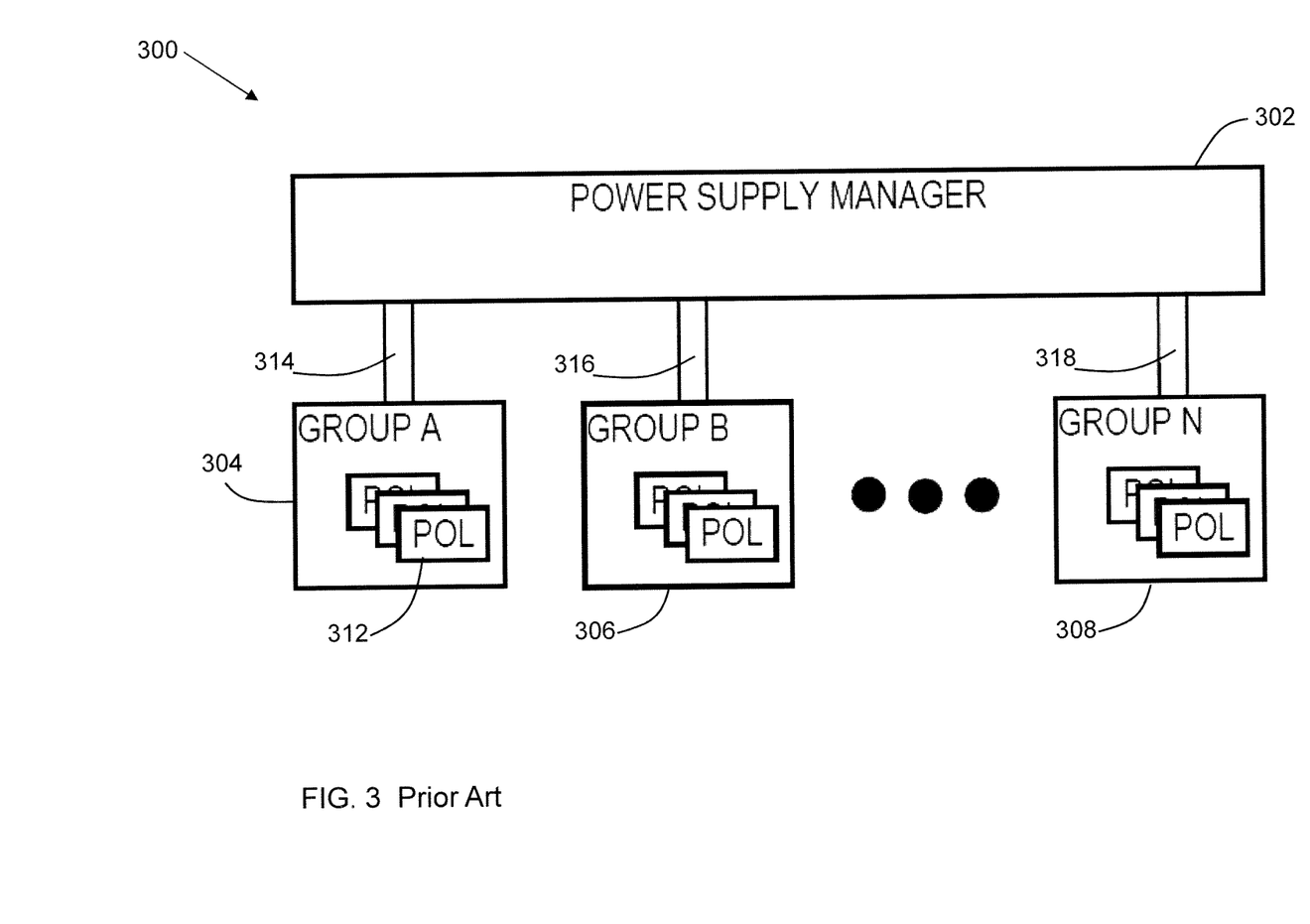
FIG. 3 illustrates a generalized distributed power system of the prior art.

FIG. 3 illustrates a generalized power management system of the prior art. In system 300, a single power supply manager 302 controls several groups of power supplies (e.g., 304, 306, and 308). Each group in system 300 includes one or more POL's (e.g., 312), which is hard-wired (e.g., 314) to a single power supply manager 302. In the example of system 300 communication wires 314, 316, and 318 are used to communicate group-specific fault and sequencing information. Moving a POL from one group to another would require a wiring change, which may be complicated to implement. Communicating information from one POL group to another POL group (e.g., group A to group B) requires coordination from a single power supply manager 302.

Accordingly, configurability and expandability of prior art systems is limited. Moving a POL from one group to another can only be done by physical rewiring. Further, the scalability is limited because the use of a single power supply manager 302 limits the total number of POLs that can be supported within the system 300.

In view of the foregoing, it would be desirable to provide systems and methods of managing distributed power supplies that avoid these problems.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The various methods and circuits disclosed herein relate to managing fault in a distributed power supply system. The system includes a plurality of POL regulators that are configured to provide power to their respective circuits and identify power fault conditions. Typically, the POL's are assigned to different physical groups based on the characteristics of the circuit loads that they supply. Each physical group of POL's has a power supply manager that is configured to communicate with other POL power supply managers over an event data bus. When a fault condition is identified by a POL, the condition is communicated to the respective power supply manager, which in turn provides the fault condition on the event data bus. Other power supply managers can then selectively take corrective action, depending on the severity of the fault condition. By dividing the signal on the event data bus into different time slots, a plurality of fault conditions can be communicated on a single serial event data bus. Further, multiple power supply managers can share the same event data bus. By eliminating a single top level manager, a theoretically unlimited number of POLs can be added to the same serial event data bus. Furthermore, these POLs may be regrouped into desired virtual groups, irrespective of their physical group boundaries, thereby providing the flexibility to reconfigure the system without any wiring changes. In contrast, the prior art does not distinguish between physical groups and virtual groups.

Figure 4:
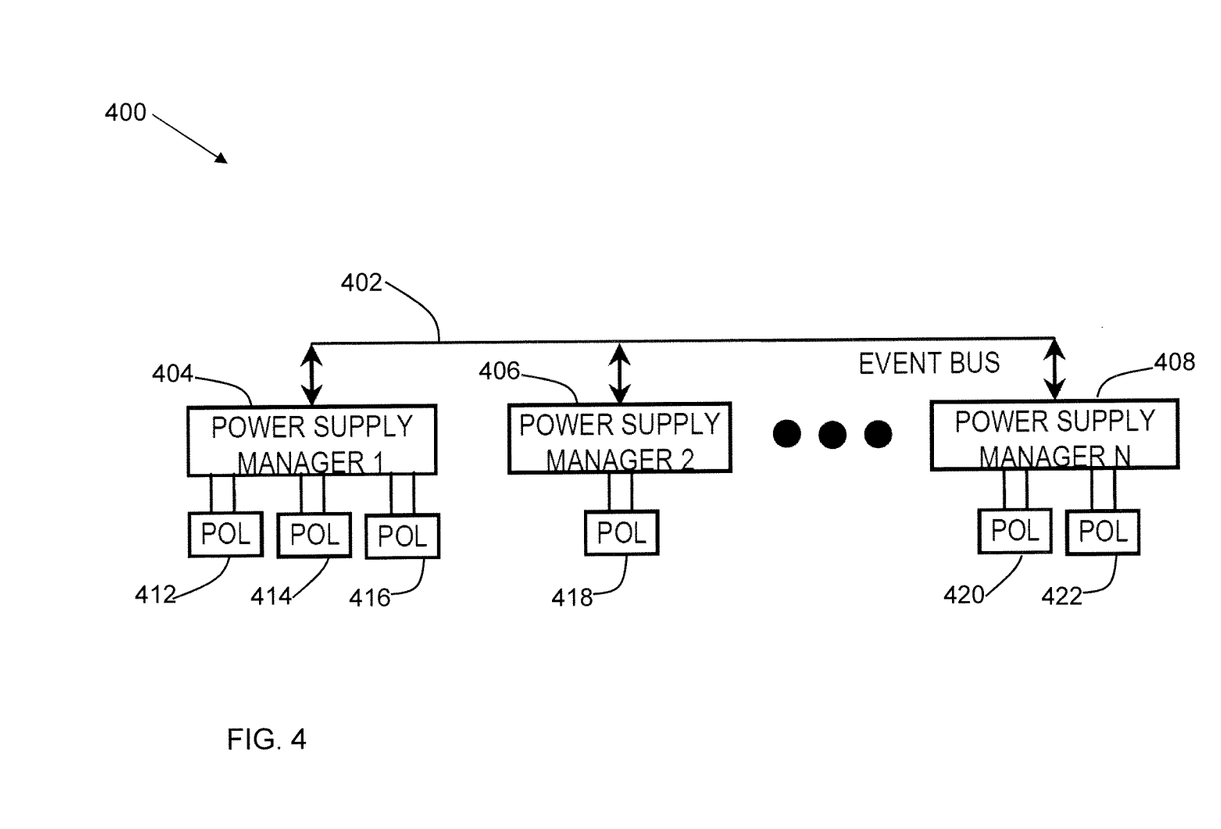
FIG. 4 illustrates an exemplary block diagram of a distributed power supply system, consistent with an embodiment of the present invention.

Reference now is made in detail to the examples illustrated in the accompanying drawings and discussed below. FIG. 4 illustrates an exemplary block diagram of a distributed power supply system, consistent with an embodiment of the present invention. System 400 includes an event data bus 402 and several power supply managers (e.g., 404, 406, and 408). Each power supply manager controls the operation of one or more POLs, respectively. In the example of system 400, power supply manager 1 (404) controls the operation of POLs 412, 414, and 416; power supply manager 2 controls the operation of POL 418; and power supply manager N controls the operation of POLs 420 and 422. In various embodiments, each power supply manager (e.g., 404, 406 and 408) may be structurally identical or may be different (e.g., support a different number of POLs).

POLs that correspond to a power supply manager are referred to herein as a POL physical group. For example, the first physical group comprises POLs 412, 414, and 416; the second physical group comprises POL 418; etc. Each physical group of POLs may share features that are common to the POLs in the physical group, such as similar voltage, current, and/or circuit block. For example, the first physical group of POLs may provide power to memory elements (e.g., DRAM) while the second physical group may power the central processing unit (CPU). In some implementations, the physical group of POLs may include multiple functional groups of POLs. For example, POLs 412 and 414 may provide power to DRAM, while POL 416 may provide power to a user debug interface.

The power supply manager of each physical group of POLs is configured to perform several functions, including functions to determine fault conditions, communicate the fault condition to other power supply managers, selectively turn ON/OFF POLs in its physical group based on the determined fault condition in its physical group, and selectively turn ON/OFF POLs in its physical group based on the severity of fault conditions provided by other power supply managers. For example, power supply manager 404 may determine one or more fault conditions of each POL in its physical group (e.g., 412, 414, and 416). For example, a fault condition may be that a POL may be overheating, generating a voltage that is above or below respective predetermined thresholds, generating a current that is above or below respective predetermined thresholds, providing a voltage or current that is fluctuating/noisy, etc. Each power supply manager (e.g., 404) is configured to determine the severity of the fault condition based on the type of POLs that it is managing. For example, more sensitive circuit blocks may have tighter controls, while less sensitive or critical circuit blocks may be given more tolerance.

Based on the identified severity of the fault condition, the power supply manager (e.g., 404) may turn OFF the POL (e.g., 412) that is the source of the fault condition. In one embodiment, the power supply manager 404 turns OFF all POLs in its physical group to prevent further escalation of the problem based on the fault condition.

The power supply manager (e.g., 404) communicates the fault condition to other power supplies (e.g., 406 and 408) in the system 400. In this regard, the power supply manager provides the information on a common single data bus 402 (i.e., referred to herein as the event data bus) that is shared by the other power supply managers 406 and 408, which are configured to listen to (e.g., read) the information of the common event data bus 402. In one embodiment, the event data bus 402 is not limited to communicating fault information. For example, the event data bus 402 may communicate additional power system information, such as POL sequencing instructions, margin commands, phase detail, etc. Margin commands relate to instructions to the POL to go a predetermined margin amount above or below a nominal target. Phase detail includes the phase relationship between multiple POLs that jointly provide a single supply (e.g., when they are connected together). For example, if a load requires 20A of current, several POLs can be joined together (e.g., a POL of 5A and a POL of 15A) to provide the required 20A of current to the load. The phase detail includes the phase relationship between the multiple POLs that are supplying a common load.

The event data bus 402 may be a bidirectional serial bus. Thus, power supply managers 404 to 408 can provide information onto the event data bus 402 and receive information therefrom. In various embodiments, the event data bus may comprise a data line and a separate clock line, or a single line where the clock information is embedded in the data stream. The specific timing and communication on the event data bus 402 is discussed in more detail in a later section.

The power supply manager (e.g., 404) is configured to monitor the event data bus 402 and obtain the fault condition (s) of other POLs (provided by their respective power supply managers). The power supply manager 404 then determines the severity of the fault condition as it pertains to its POLs and decides on what action to take. Thus, the power supply manager 404 may turn OFF all of its POLs in its physical group to prevent failure, such as an overload condition or unreliable operation of the circuits that its POLs are powering.

When a fault condition is announced by a power supply manager on the event data bus 402, several actions may occur based on their respective rule set (e.g., based on the type of load their physical group of POLs are driving): (i) one or more power supply managers may regard the fault as "minor" and ignore it; and/or (ii) one or more power supply managers may regard the fault as "serious" and immediately shut down their respective POLs. Accordingly, for a given fault read from the event data bus, different physical groups of POLs may be turned OFF based on how serious the fault is for the respective POLs. Communication of multiple power supply managers (e.g., 404, 406, and 408) in system 400 eliminates the need for a single top level manager of the prior art.

In additional to physical groups, POLs may include virtual groups. A virtual group of POLs allows separate POLs to be virtually coupled to a power supply manager that is physically separate therefrom. Thus, in a virtual POL group, a power supply manager controls the operation of POLs that may not be in close proximity. The power supply manager controls each respective POL via messages over the event bus.

Individual POLs can be moved from one POL virtual group to another, and reconfigured within other virtual groups, without board level changes. Further, additional POLs can be added to the same event data bus 402 without conflict and without one or more dedicated lines between additional POLs and the single top level manager, as required in the systems of the prior art.

Figure 5:
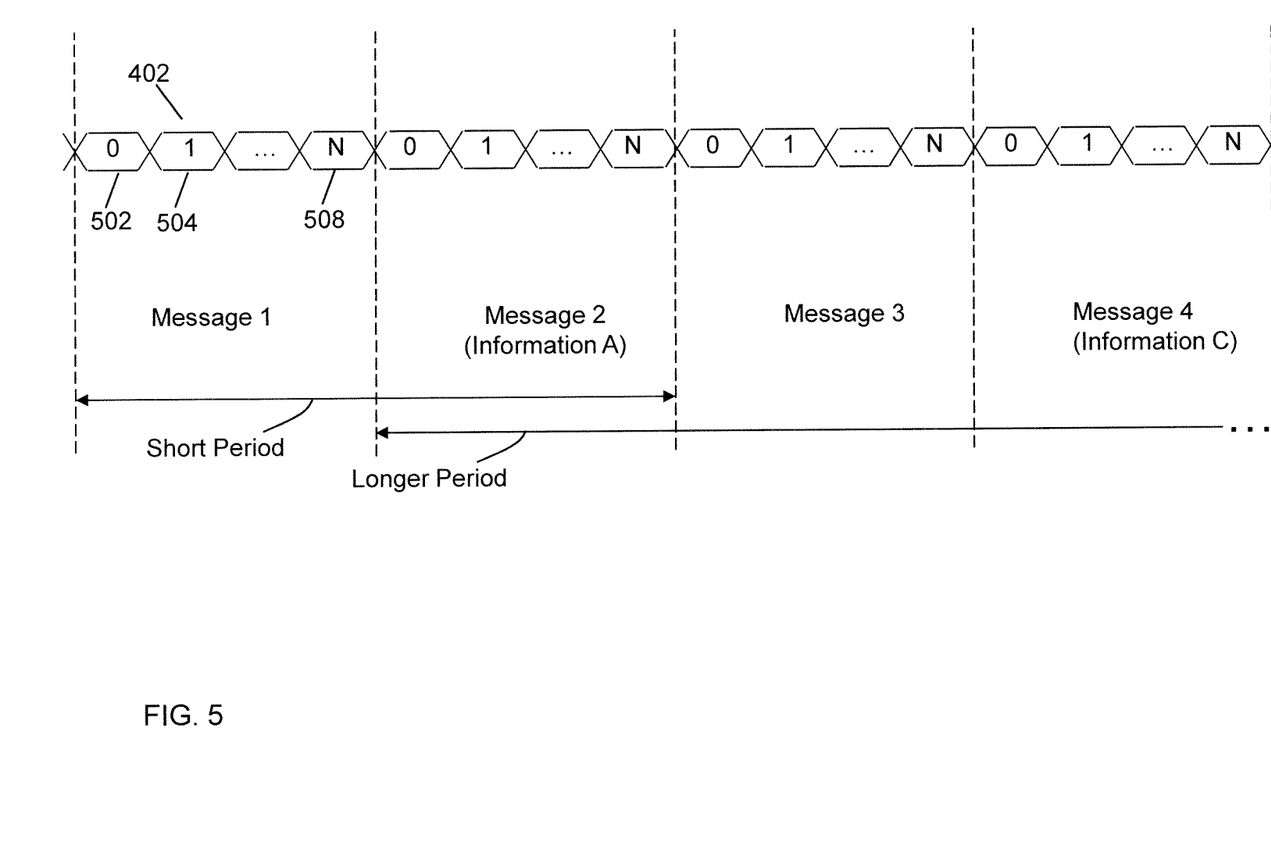
FIG. 5 illustrates a data bit stream provided by one or more power supply managers on an event data bus.

Perhaps it would now be helpful to explain how the event data bus 402 is shared between multiple power supply managers. FIG. 5 illustrates a data bit stream provided by one or more power supply managers on the event data bus. As discussed above, the event data bus may be a data wire that is shared by several power supply managers. By dividing the signal on the event data bus into different time slots, a plurality of fault conditions (e.g. N) can be communicated on the single serial event data bus. Put differently, a single wire can represent N virtual wires, where each wire represents a fault condition. In one embodiment, each fault has a predetermined time slot allocated to it. For example, time slot 502 may correspond to overheating, time slot 504 may correspond to excessive current, and time slot 508 may correspond to high voltage. When a fault condition is identified by a power supply manager with respect to one or more POLs in its physical group, the power supply manager communicates the fault by providing a high/low signal on the event data bus during the allocated time slot. Thus, if the voltage provided by a POL in a physical group is too high, time slot 508 is asserted. For example, a high may indicate that there is no fault while a low signal may indicate a fault. Each time slot represents a virtual wire and N virtual wires represent a message.

As used herein, the term "voting" refers to providing a signal at a predetermined time slot. The voting signals are provided by respective power supply managers in order to place information on the event data bus, including information to identify a fault in one or more of the POLs in their respective virtual group. Thus, voting may be interpreted as providing a signal on a virtual wire to indicate a fault. A plurality of power supply managers may "vote" at a predetermined time slot on the event data bus by asserting, for example, a high or low signal. Thus, multiple power supply managers may use the identical time slot simultaneously to identify the same fault. In one embodiment, the virtual wire may be configured as a "wired-OR," where any high vote would indicate a fault on the event data bus. Thus, the event data bus indicates a particular fault if any one (or more) of the plurality of power supply managers coupled to the event data bus asserts a fault in a particular time slot. Put differently, in order for the event data bus not to indicate an error on its event data bus, none of the power supply managers coupled to the event data bus are experiencing that particular fault (and are therefore not asserting a fault during the particular time slot).

Advantageously, due to the "wired-OR" configuration, additional power supply managers may be added that share the time slot for a predetermined fault condition, without conflict or additional wires between the power supply managers. Thus, additional power supply managers can be added to the event data bus without additional overhead.

In various embodiments, different signaling standards may be used by the event data bus, such as low-voltage positive/pseudo emitter-coupled logic (LVPECL), current-mode logic (CML), voltage-mode logic (VML), and low voltage differential signal (LVDS). Further, the clock may be provided as a separate signal or embedded within the data stream.

Figure 6:
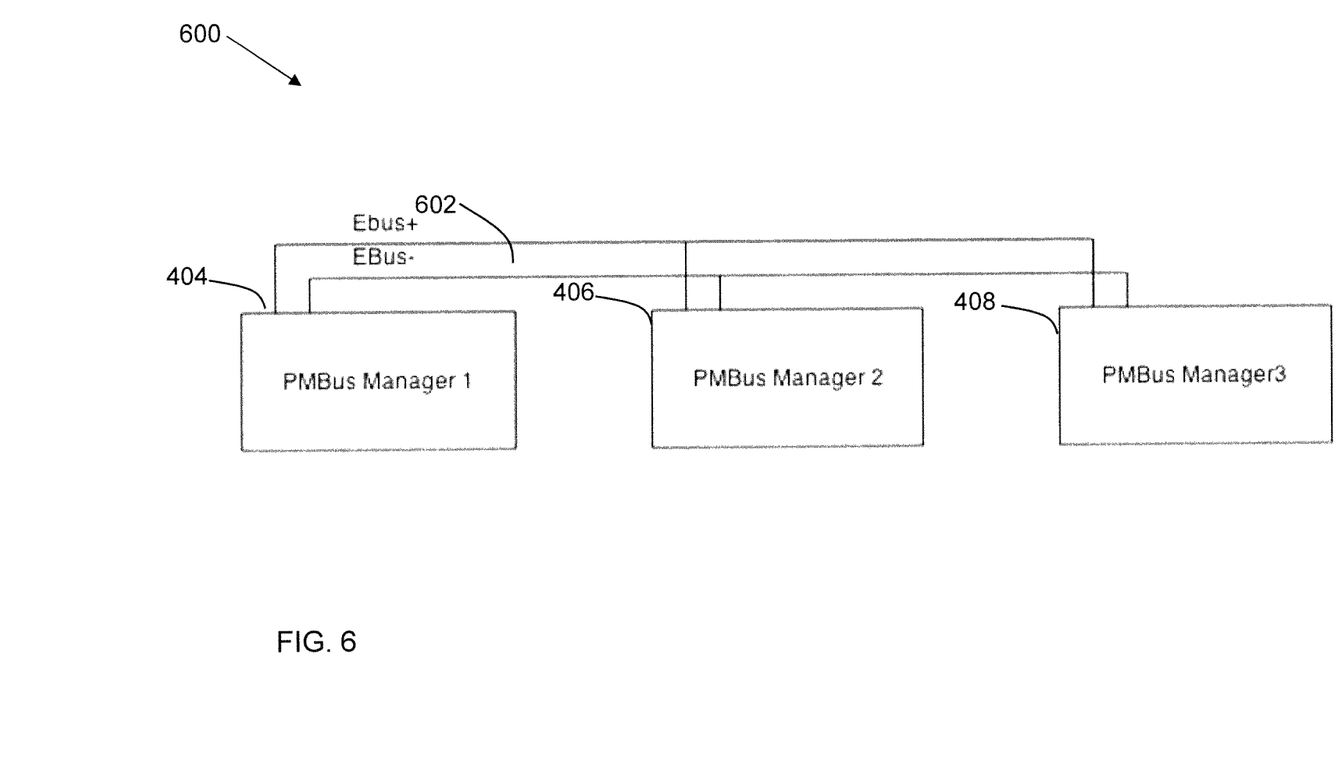
FIG. 6 illustrates a system where several power supply managers communicate over a common event data bus.

As discussed above, several power supply managers may be coupled to the same event data bus as well. In this regard, FIG. 6 illustrates a system where several power supply managers (i.e., 404, 406, and 408) communicate over a common event data bus 602. The event data bus 602 includes separate paths for the EPLUS and EMINUS signals.

Figure 7:
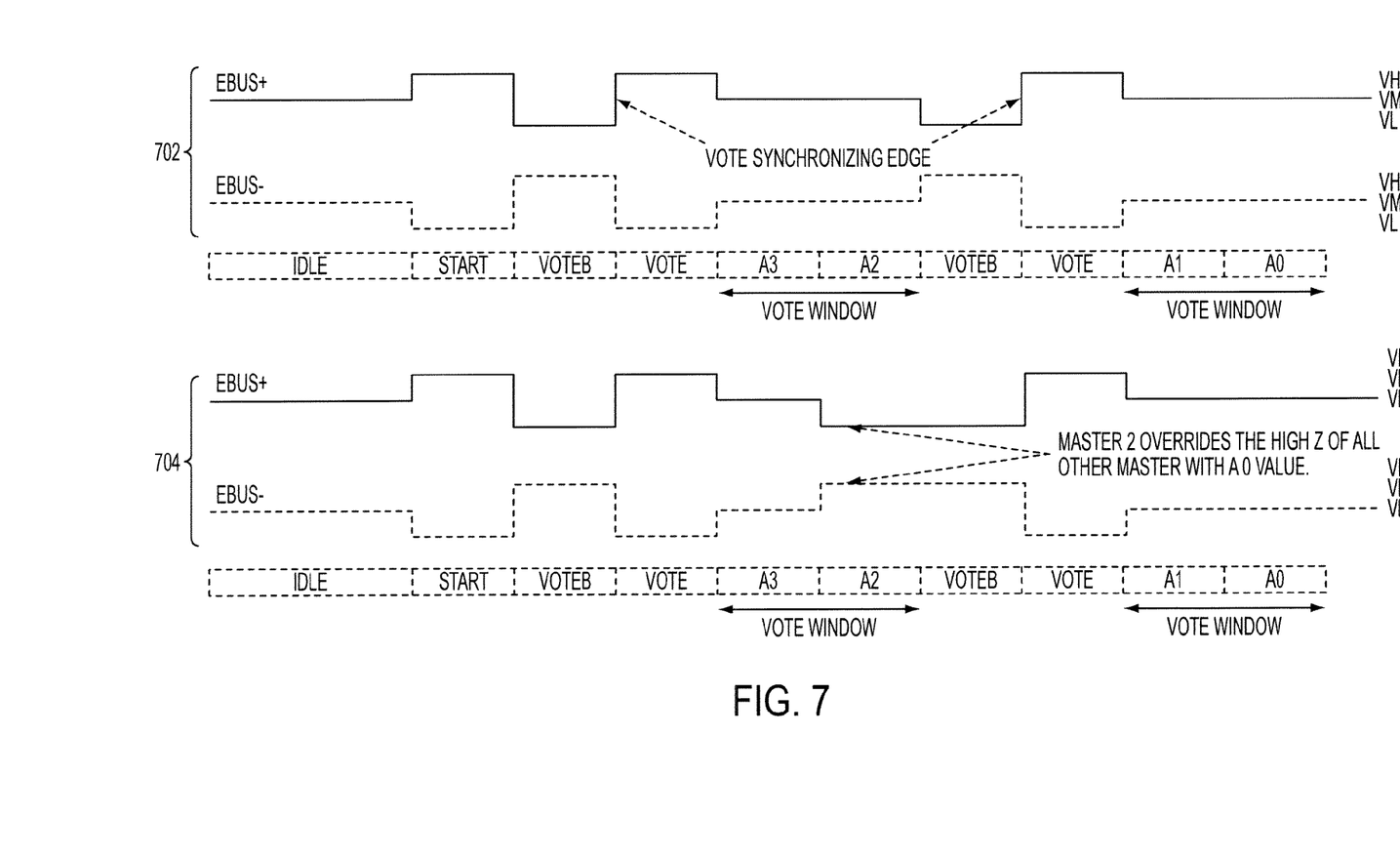
FIG. 7 illustrates timing diagrams of several power supply managers communicating signal levels over the same event data bus.

FIG. 7 illustrates various timing diagrams of several power supply manager communicating signal levels over the same event data bus. All power supply managers may participate in such voting of a single bit. Accordingly, the effective data rate of the bus increases since many power supply managers have the capacity to communicate information simultaneously during the same time slot.

As illustrated in the timing diagram 702, each vote window (e.g., contiguous set of time slots during which voting takes place) may be preset with a voteb=0 and vote=1. In one embodiment, the voteb/vote presets occur at the start of the voting window. The voting window includes multiple time slots. For example, the first pair of voteb/vote presets illustrated in FIG. 7 may apply to both the a0 and a1 time slots. Such preset guarantees a rising edge. All power supply managers may use internal timers to identify the two bit positions a3 and a2 after the voteb/vote rising edge. Each power supply manager then drives logic 0 or tri-state during each of the two bit positions a3 and a2. When all managers tri-state EPLUS and EMINUS during bit position a3, the value provided on the event data bus is interpreted as a logic 1. When any power supply manager drives a logic 0 on EPLUS and EMINUS during bit position a3, then the value provided on the event data bus is interpreted as a logic 0. Thus, bit position a3 corresponds to a single wire-OR style voting bit for all managers. Likewise, a2 corresponds to another single wire-OR style voting bit for all managers. The number of such voting bits that can occur after the vote/b rising edge can be more or less than two, depending on factors such as local clock accuracy, event bus physical length, etc. Timing diagram 702 shows a second pair of voting bits (a1 and a0) happening immediately after the first pair.

One or more masters (e.g., power supply managers that are driving a signal on the event data bus) may include EPLUS and EMINUS wires to create start, voteb, and vote. Signal contention is prevented since the power supply managers drive the same signal level.

Waveform 704 illustrates a situation where, for example, a second power supply manager wants to assert the address on the event data bus to be a[3:0]=1011b. For example, when the time slot for bit a2 arrives, power supply manager 2 drives over the tri-stated levels. All power supply managers interpret the address to be a[3:0]=1011b. As soon as a power supply manager interprets a multi-bit address to have a signal content that is different than the one they are attempting to send, the power supply manager may tri-state all remaining voting bits, and thus lose arbitration. All power supply managers capture the resulting address. For example, the EPLUS signal wire may be configured as a "wired-OR" and the EMINUS wire may be configured as a "wired-AND" with respect to the coupled power supply managers.

Messages from power supply managers may include collision detection bits instead of, or in addition to, voting bits. The collision detection bit may be driven asynchronously for multiple clock periods by several power supply managers that are used in master mode. This bit may be driven for multiple clock periods to ensure that all master power supply managers and listening power supply managers ("slaves") are able to detect whether any other power supply managers are also driving the bit.

Figure 8:
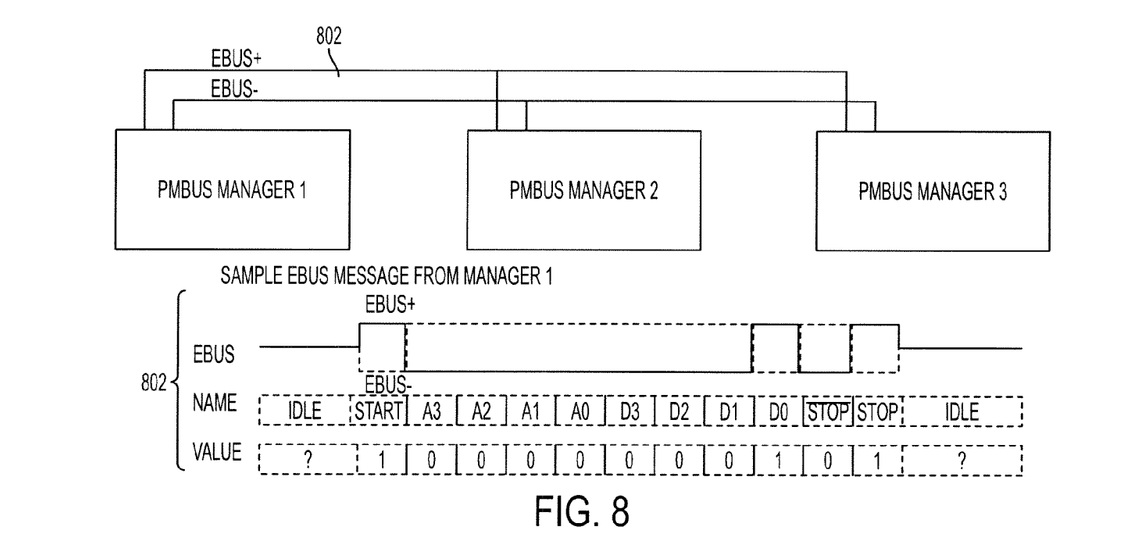
FIG. 8 illustrates a message on an event data bus from a first power supply manager without involvement from another power supply manager.

All master power supply managers drive the collision detection bit with the same value. When the differential voltage of the event data bus during the predetermined time slot is twice (or higher) than its nominal single driver expected voltage, it then follows that multiple drivers are active and there is a bit collision situation. Such collision situation may be detected by every power supply manager coupled to the event data bus 802.

In one embodiment, every power supply manager monitors the event data bus for start and stop bits, and does not start a message while another master is keeping the bus busy. However, two power supply managers (e.g., masters) may start transmission at about the same time. In such a situation, arbitration occurs. Slave transmit mode can also be arbitrated, when a master (e.g., transmitting power supply manager) addresses multiple slaves (e.g., listening power supply managers), which is less common.

In contrast to protocols (such as Ethernet) that use random back-off delays before issuing a retry, a deterministic arbitration policy may be used. Each power supply manager checks the level of the signal on the event data bus during a set of voting bits and compares it to expected levels. When the comparison indicates that the levels do not match what that master is trying to send, that master loses arbitration and drops out of this protocol interaction.

For example, when one master power supply manager votes a logic 1 by tri-stating the event data bus and a second transmitter sets it to a low level (e.g., 0-pull to ground). The first transmitter then determines that the level of the event data bus for the particular time slot is different than expected and concludes that another node is transmitting. The first power supply manager to notice a difference is the one to lose arbitration. Consequently, the losing power supply manager stops driving the event data bus for the remaining voting bits used for arbitration, and waits for a STOP. The losing power supply manager may then reissue its entire message.

FIG. 8 illustrates a message (e.g., bit data) from a first power supply manager, without involvement from another (e.g., second) power supply manager. Thus, there is no "voting" to decide the signal level on the event data bus 802 for any particular time slot.

Figure 9:
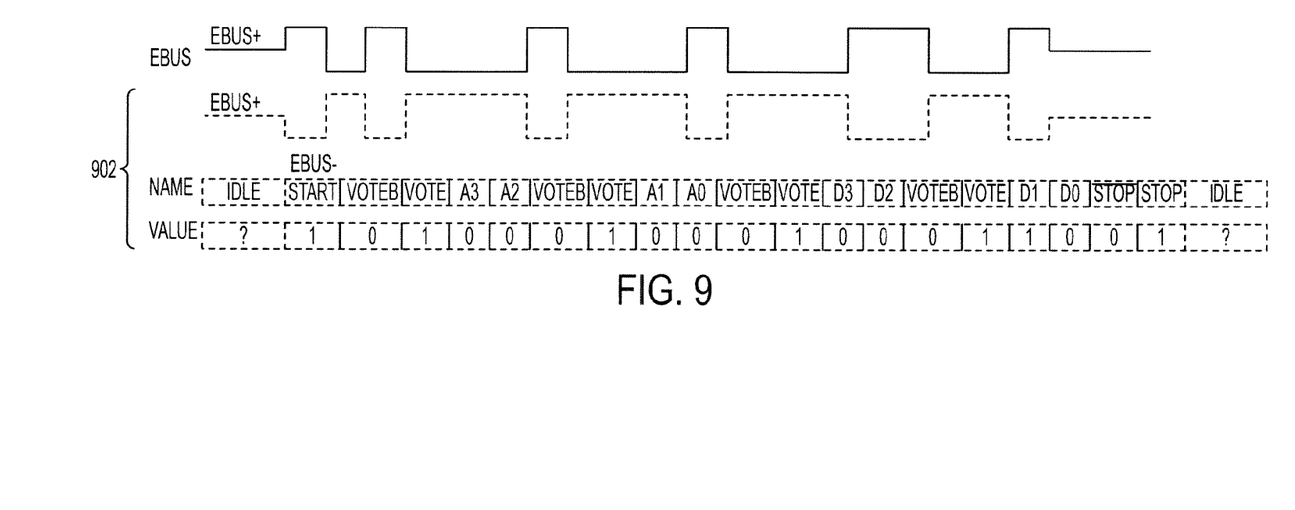
FIG. 9 illustrates a timing diagram where multiple power supply managers vote to decide the signal level on the event data bus for a particular time slot.

By way of example, FIG. 9 illustrates a scenario where multiple power supply managers "vote" to decide the signal level on the event data bus for a particular time slot. In the example of FIG. 9, power supply managers 1 and 2 both want to assert address 1111b with data 1111b. However, power supply manager 3 overrides with address 0000b (i.e., because it has a lower "slave" address) with data 0010b.

The components, steps, features, objects, benefits and advantages that have been discussed herein are merely illustrative. None of them, nor the discussions relating to them, are intended to limit the scope of protection. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently. For example, any signal discussed herein may be scaled, buffered, scaled and buffered, converted to another mode (e.g., voltage, current, charge, time, etc.,), or converted to another state (e.g., from HIGH to LOW and LOW to HIGH) without materially changing the underlying control method. Accordingly, it is intended that the invention be limited only in terms of the appended claims.

The scope of the appended claims is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, system, or apparatus that comprises a list of elements does not include only those elements but may include other elements not expressly listed or inherent to such process, method, system, or apparatus. An element proceeded by "a" or "an" does not, without further constraints, preclude the existence of additional system elements in the process, method, system, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A power control system comprising:
    an event data bus configured to carry event information;
    a plurality of power supply managers, each coupled to the event data bus;
    one or more point of load (POL) regulators assigned to each power supply manager, respectively;
    wherein each power supply manager is configured to communicate event information with other power supply managers over the event data bus, and
    wherein in a given period, more time slots are allocated on the event data bus the more critical a fault condition is.

2. The system of claim 1, wherein the event information comprises one or more fault conditions of a POL regulator.

3. The system of claim 2, wherein:
    the event data bus is divided into periodic time slots; and
    each different fault condition has a different time slot.

4. The system of claim 1, wherein each power supply manager is configured to determine one or more fault conditions of the one or more POL regulators assigned to it.

5. The system of claim 1, wherein each power supply manager is configured to determine one or more fault conditions of other power supply managers coupled to the event data bus by monitoring the event information on the event data bus.

6. The system of claim 5, wherein each power supply manager is configured to selectively turn ON/OFF the one or more POL regulators assigned to it based on at least one of:
    a determined fault condition of one or more POL regulators assigned to it; and
    a fault condition provided by other power supply managers, determined via the event information on the event data bus.

7. The system of claim 5, wherein each power supply manager is configured to:
    determine a severity of a fault condition determined from the event information of the event data bus based on a type of POL regulators assigned to it; and
    selectively turn ON/OFF the POL regulators assigned to it based on the severity of each fault condition.

8. The system of claim 1, wherein the event data bus is configured to:
    receive event information from several power supply managers during a predetermined time slot; and
    indicate that there is a fault condition if one or more of the plurality of power supply managers assert the fault condition during the predetermined time slot.

9. The system of claim 1, wherein the event data bus is configured to carry power system information comprising at least one of:
    (i) POL sequencing instructions,
    (ii) margin commands, and
    (iii) phase information.

10. The system of claim 1, wherein the assignment of POL regulators with their respective power supply manager is based on (i) a physical grouping or (ii) virtual grouping, wherein the physical grouping is different from the virtual grouping.

11. In a system comprising an event data bus, a plurality of power supply managers, each coupled to the event data bus, one or more point of load (POL) regulators assigned to each power supply manager, respectively, a method of controlling the POL regulators, comprising each power supply manager:
    determining a fault condition of the one or more POL regulators assigned to it; and
    simultaneously broadcasting the fault condition by providing a predetermined voltage level at a predetermined time slot on the event bus;
    monitoring the event data bus for a fault condition;
    upon identifying a fault condition from the event data bus, selectively turning ON/OFF the POL regulators assigned to each power supply manager, respectively, wherein in a given period, more time slots are allocated on the event data bus the more severe fault condition is.

12. The method of claim 11, wherein:
    the event data bus is divided into periodic time slots; and
    each different fault condition has a different time slot.

13. The method of claim 11, further comprising selectively turning ON/OFF the POL regulators based on a determined fault condition of one or more POL regulators assigned to it.

14. The method of claim 11, further comprising:
    determining a severity of a fault condition identified from the event data bus based on a type of POL regulator assigned to the power supply manager, respectively; and
    selectively turning ON/OFF the POL regulators assigned to it based on the severity of each fault condition.

15. The method of claim 11, further comprising identifying that the fault condition exists if one or more of the plurality of power supply managers broadcast the fault condition during the predetermined time slot.

16. The method of claim 11, further comprising receiving from the event data bus power system information comprising at least one of:
    (i) POL sequencing instructions,
    (ii) margin commands, and
    (iii) phase information.

17. The method of claim 11, wherein the assignment of POL regulators with their respective power supply manager is based on (i) a physical grouping or (ii) virtual grouping, wherein the physical grouping is different from the virtual grouping.

* * * * *